United States Patent [19]
Colquhoun

[11] 3,912,652
[45] Oct. 14, 1975

[54] DEFOAMING COMPOSITION USEFUL IN JET DYEING
[75] Inventor: Joseph A. Colquhoun, Midland, Mich.
[73] Assignee: Dow Corning Corporation, Midland, Mich.
[22] Filed: Dec. 17, 1973
[21] Appl. No.: 425,371

[52] U.S. Cl. .............................. 252/358; 8/83; 8/92; 8/93; 252/321
[51] Int. Cl.² ..................... B01D 19/04; C09B 67/00
[58] Field of Search ............ 252/358, 321; 260/825, 260/29.2 M; 8/83, 92, 93

[56] References Cited
UNITED STATES PATENTS
3,700,400  10/1972  Cuthbertson .............................. 8/83
3,784,479  1/1974  Keil ...................................... 252/358

*Primary Examiner*—Benjamin R. Padgett
*Assistant Examiner*—David Leland
*Attorney, Agent, or Firm*—Robert F. Fleming, Jr.

[57] ABSTRACT

A composition suitable for use as a defoamer in dyeing operations is made by mixing (1) 80 to 96 percent by weight of a block copolymer of dimethyl siloxane and a polyalkylene oxide and (2) 4 to 20 percent by weight of a condensation product of (B) a copolymer of $(CH_3)_3SiO_{.5}$ units and $SiO_2$ units in a mol ratio of 0.4:1 to 1.2:1 and (C) an alkylene oxide in amount of from 15 to 50 weight percent (B) and 50 to 85 weight percent (C). These formulations are particularly useful in jet dyeing operations.

6 Claims, No Drawings

DEFOAMING COMPOSITION USEFUL IN JET DYEING

It is known from U.S. application, Ser. No. 144,264, filed May 17, 1971 now U.S. Pat. No. 3,785,435, that silicone glycol copolymers of the type (1) of this invention can be used when diluted with alkylene oxides as defoamers for latex formulations. However, the silicone glycols of the type (1) of this application whether used alone or in conjunction with alkylene oxides do not operate in the defoaming processes of this invention, particularly in the jet dyeing operations, because they plate-out on the equipment and do not function efficiently.

It is also known from U.S. Pat. No. 3,746,653 and applications Ser. No. 253,617, filed May 15, 1972 now U.S. Pat. No. 3,784,479 and No. 313,892, filed Dec. 11, 1972, that silicone glycols of the type (1) claimed herein can be used in conjunction with silica and other types of silicones as defoamers in various operations. These defoamers may also contain silicones of the type (2) shown herein. However, all of these defoamers suffer from one or two disadvantages. Either they do not function satisfactorily in the jet dyeing operation, or they are incompatible with the dye carriers used in jet dyeing operations or they suffer from both disadvantages. Furthermore, both the patent and the two applications require the presence of silica as an essential ingredient of the compositions for operativeness as defoamers. Thus, it would be most unexpected that elimination of the silica from the formulations would produce suitable defoamers.

It is the object of this invention to provide a composition which is compatible with dye carriers used in jet dyeing operations and which will also function suitably as a defoamer during the dyeing operation. Thus, a dyer can premix the dye carrier and the defoamer, store it for long periods of time, and use the combination in the jet dyeing operations without fear of having the defoamer malfunction.

Jet dyeing is employed primarily with polyester fibers which are extremely difficult to dye otherwise. In this operation, the fibers in the form of ropes are run through conduits known as jets and into a tank partially filled with the dyeing solution. The dyeing medium is pumped from the tank through a pump and through the jets and back into the tank. This means that the dyeing medium is cascading from the conduits or jets into the reservoir. During this cascading action, severe foam can build up interfering with proper dyeing of the fabric and also causing cavitation in the pump. The dyeing operation is carried out under pressure at 250°F. or above and when the operation is finished the reservoir is cooled to 190°F. and the pressure is released. At this point the dye medium can foam severely and will boil out of the apparatus causing problems in the plant. The defoamer must prevent buildup of foam in the reservoir during pumping and prevent discharge of foam from the apparatus when the pressure is relieved. The products of this invention will function for both types of defoaming.

Another problem which is often encountered with the use of silicone defoaming material used in dyeing operations is the fact that many silicones contribute to the flammability of the fabric. This is particularly true with respect to carpets and applies both to polyester carpets and to nylon carpets as well as others. The reason for the greater flammability is not clearly understood but it seems to be due to alteration of surface tension in the molten polyester or nylon. Many silicone defoamers cannot be removed from the surface of the fabric even by washing. Thus, the enhanced flammability is a permanent part of the fabric.

The dyeing medium used in jet dyeing consists of a dye, a dye carrier and water. The dye carriers are solvents such as hydrocarbons, halogenated hydrocarbons, alcohols, or ketones, and non-solvent materials such as diphenyl. The carrier functions as a softener for the fibers during the dyeing operation. This softening of the fiber allows the dye to penetrate the fiber and enhances the dye effectiveness. Usually dye carriers are a combination of swelling agents for the fiber and detergents which will allow the dye carrier to be emulsified in the aqueous medium used in the dyeing operation. The detergents normally employed are anionic detergents of the well known type. The compounds of this invention are compatible with solvent-detergent combinations used in the dyeing industry and, hence, can be preformulated prior to the dyeing operation.

This invention relates to compositions suitable for defoaming aqueous media consisting essentially of (1) from 80 to 96 percent by weight of a water soluble copolymer of the group consisting of $R_a Si \{(OSiMe_2)_n(OSiMeG)_m OSiMe_2G\}_{4-a}$,
$R_a Si \{(OSiMe_2)_n(OSiMeG)_m OSiMe_3\}_{4-a}$,
$GMe_2Si(OSiMe_2)_n(OSiMeG)_m OSiMe_2G$, and
$Me_3Si(OSiMe_2)_n(OSiMeG)_m OSiMe_3$ in which $n$ has an average value of from 6 to 400, $m$ has an average value from 3 to 30, $a$ has an average value of 0 to 1, R is a hydrocarbon radical free of aliphatic unsaturation of from 1 to 10 carbon atoms, G is a radical of the formula $-D(OR')_y OA$ in which D is an alkylene radical of 2 to 10 carbon atoms, R' is $-CH_2CH_2-$ or a combination of $-CH_2CH_2-$ and

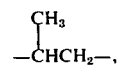

$y$ has an average value of at least 5 and A is hydrogen or a capping group of 1 to 10 carbon atoms, and (2) from 4 to 20 percent by weight of a copolymer compatible with (1) prepared by condensing (B) a siloxane containing SiOH group and being essentially of $Me_3SiO_{.5}$ units and $SiO_2$ units in the mol ratio of from 0.4:1 to 1.2:1 and (C) a polyether of the group consisting of polyethylene oxide, polypropylene oxide, and copolymers thereof, in (2) the weight ratio of (B) to (C) being in the range from 15 to 50 percent (B) to 50 to 85 percent (C).

The proportions of (1) and (2) shown above are critical for operativensss in this invention. Compositions (1) are well known materials of commerce as is shown in the aforementioned U.S. Pat. No. 3,746,653 and in many other published articles and patents.

In brief, they are prepared by reacting the corresponding siloxanes, in which SiH groups are in place of the G groups, with polyalkylene oxides having alkenyl groups attached to at least one end. The addition is usually carried out in the presence of a platinum catalyst. Often the reaction is carried out in the presence of excess polyether. This ensures complete reaction of all the siloxane. This excess polyether does not have to be removed for the purpose of this invention.

R can be any hydrocarbon radical of 1 to 10 carbon atoms which is free of aliphatic unsaturation such as, methyl, ethyl, isopropyl, butyl, decyl, phenyl, tolyl, or cyclohexyl. D is any alkylene radical of from 2 to 10 carbon atoms such as, dimethylene, tetramethylene, or decamethylene, or

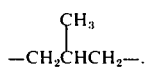

As can be seen, these polyalkylene oxides can either be derived from ethylene oxide or copolymers of ethylene oxide and propylene oxide. The only critical feature is that the resulting silicone-polyether copolymer be soluble in water.

For the purpose of this invention (A) which is the capping group can be hydrogen or any of the groups normally used to cap alkylene oxides. These groups generally have from 1 to 10 carbon atoms and can be attached to the alkylene oxide moiety, for example, by ether linkages, ester linkages, amide linkages or urethane linkages. The hydrocarbon portion of the capping group can be from 1 to 10 carbon atoms and can be any hydrocarbon radical such as methyl, ethyl, vinyl, allyl, butyl, or phenyl.

Ingredient (2) is prepared by condensing (B) with (C) in the presence of a condensation catalyst such as potassium hydroxide or tin octoate. This condensation is believed to establish SiOC linkages between the siloxane resin and the polyalkylene oxide via the reaction:

SiOH + HOC → SiOC + H$_2$O or
SiOSi + HOC → SiOC + SiOH or both.

The precise nature of the copolymer is not known but it is best prepared by adding (C) to a refluxing solution of (B) in a mutual solvent, such as xylene, containing alcoholic KOH in amount of from 0.05 to 0.1 percent by weight KOH based on the weight of (B). The time of reaction is such that the reaction product is compatible with (1)*. (In general reaction times of 1 to 3 hours are sufficient.) This means that (2) is dispersible in (1) to an extent sufficient to operate as a defoamer in aqueous media.

*(B) is compatible with (1).

The most preferred forms of (2) are those having a solubility factor of from 14 to 17. As reaction of (B) and (C) takes place the solubility factor rises from 0 to 25 or more due presumably to changes in the structure of the copolymer. In any event it has been found that the best products are obtained where reaction is stopped when the solubility factor is within the above range although operative products are obtained outside the range as long as (1) and (2) are compatible.

The solubility factor is determined by mixing 5 g. ± .01 g. of a trimethylsiloxy endblocked dimethylpolysiloxane of 1000 cs. viscosity at 25°C. and 0.8 g. ± .01 g. of a 50 percent xylene solution of (2) in a clear vessel having an inside diameter of 2.2 cm. (1 oz. glass vial). The mixture is cloudy. Ortho xylene is then added to the mixture, with magnetic stirring, until parallel lines on flat cardboard are just resolved when viewed by eye through 2.2 cm. of the liquid. The lines are 0.6 mm. wide and are located 1.6 mm. apart. The number of ml. of ortho xylene required to reach this endpoint is recorded as the solubility factor.

(B) is a well known article of commerce and is prepared by reacting trimethyl siloxane with a silica sol in the presence of an acidic catalyst as shown, for example, in U.S. Pat. No. 2,676,182. (C) can be either polypropylene oxide, polyethylene oxide, or copolymers of these two. The proportions of (B) and (C) in ingredient (2) are critical for the purpose of this invention.

The compositions are prepared by merely mixing (1) and (2) in any desired manner. If desired, (2) can be dispersed in a suitable solvent such as xylene and there is no need to remove the solvent after mixing.

The effectiveness of the compositions of this invention to operate for the intended use was determined by the hot pump test. In this test the apparatus employed consists of a motor-driven pump (Eastern Industries Model B-1; Style CZZ-71-ZV) which continuely recirculates the foaming system. The foaming system is pumped at the rate of 5000 ml. per minute into a stainless steel cylinder of 2000 ml. capacity where the foam height is measured. A heating mantel is at the base of the cylinder to control the temperature. This test subjects the antifoam material to high amounts of agitation, emulsification and shear in the test apparatus. The test is run using a thousand milliliters of 1/10 percent Tween 80 (polyoxyethylene sorbitan monooleate) solution in water. This solution is placed in the pump test vessel. The defoamer is added in the form of a 10 percent aqueous solution which was made by adding the defoamer to cold water. In each case the defoamer is employed in amount to give 200 parts per million of the antifoam material based on the weight of the foaming solution.

After the foaming solution is placed in the cylinder, the vessel is heated to 150°F. and the defoaming solution is added. Heating is continued until 190°F. is reached and the pump is started. The temperature then drops to 180°F. and the pump is run for six minutes or until the foam height reaches 3 inches in the vessel. The pump is then stopped and the time required for the foam to break in seconds is determined. During the test careful observation is made to see whether or not the defoamer plates out; that is, deposits on the surface of the apparatus. If this happens to any substantial degree, the defoamer is considered to have failed the test.

The following examples are illustrative only and should not be construed as limiting the invention which is properly delineated in the appended claims.

EXAMPLE 1

The silicone polyether copolymers (1) employed in this example are numbered 1 through 5. They had the compositions as follows:

1. Me$_3$SiO(Me$_2$SiO)$_{108}$(MeGSiO)$_{10}$SiMe$_3$
2. GMe$_2$SiO(Me$_2$SiO)$_{115}$(GMeSiO)$_{5.5}$SiMe$_2$G containing 25 percent by weight dipropylene glycol (DPG) solvent
3. Me$_3$SiO(Me$_2$SiO)$_{130}$(MeGSiO)$_{10}$SiMe$_3$
4. GMe$_2$SiO(Me$_2$SiO)$_{150}$(MeGSiO)$_8$SiMe$_2$G containing 10 percent by weight DPG
5. GMe$_2$SiO(Me$_2$SiO)$_{150}$(MeGSiO)$_{15}$SiMe$_2$G containing 15 percent by weight DPG In each of the above formulations, G had the formula

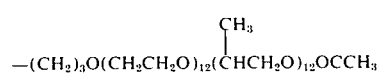

Resin cocondensate E used herein was made by condensing 33 percent by weight of a copolymer of trimethyl siloxane and SiO$_2$ having a (CH$_3$)$_3$Si to SiO$_2$ ratio of 0.67:1 and 67 percent by weight of polypropylene oxide having a molecular weight of 4100 in the presence of potassium hydroxide catalyst to give a copolymer of said weight ratio. The copolymers had a solubility factor of 15.

In each case shown below, 87 percent by weight of the silicone polyether (1) was mixed with 13 percent by weight of a 50 percent xylene solution of resin condensate E. This mixture was then added to cold water as shown above and tested in the hot pump test.

| Compound | Foam Height in Inches | Break Time in Seconds | Plated-Out |
|---|---|---|---|
| 1 | 2 | 12 | yes |
| 1 + E | 1 | 5 | no |
| 2 | 2 | 11 | yes |
| 2 + E | 1.5 | 7 | no |
| 3 | 3 | 26 | yes |
| 3 + E | 1 | 5 | no |
| 4 | 2 | 13 | yes |
| 4 + E | 1 | 3 | no |
| 5 | 2.5 | 16 | yes |
| 5 + E | 1 | 3 | no |

In each case shown above the defoamer was employed in amount of 200 parts per million based on the weight of the foaming solution.

EXAMPLE 2

This example shows the operativeness of the compositions of this invention with an actual dye carrier employed in commercial jet dyeing. The defoamer employed in this example was a mixture of 87 percent by weight of silicone glycol 2 of Example 1 and 13 percent by weight of a 50 percent xylene solution of condensate E of Example 1. The defoamer was added to a commercial dye carrier which is a mixture of perchloroethylene and an anionic detergent in amount to give 5 percent by weight of the silicone defoamer. The mixture was then diluted with water to give a 10 percent aqueous solution. This 10 percent aqueous solution was then added to the foaming solution as shown above in amount to give 200 parts per million of the defoamer. After addition of the defoamer, acetic acid was added in amount to bring the pH of the foaming solution to between 4 and 5. The pump test was run as shown above and the results were that the foam height was slightly over 1 inch, the break time was 5 seconds and there was no plating-out of the defoamer or other materials on the surface of the vessel.

EXAMPLE 3

This example illustrates the operative proportions of (2) relative to (1) as measured by the hot pump test supra. Ingredient (1) employed in this example was the silicone polyether 2 of Example 1. Ingredient 2 employed was a 50 percent xylene solution of E of Example 1. The proportions shown in the table below are the weight percentages of undiluted E plus undiluted 2 based on the combined weights of E and 2:

| Percent By Weight E | Foam Height In Inches | Break Time In Seconds | Plated-Out |
|---|---|---|---|
| 3.8 | 1 | 10 | yes |
| 5.4 | 1.5 | 12 | no |
| 11.2 | 1.25 | 9 | no |
| 13.5 | 1.5 | 10 | no |
| 16.1 | 1.5 | 5 | no |
| 24.8 | 1 | 4 | yes |

EXAMPLE 4

This example indicates that the defoamers of this invention do not contribute to the flammability of carpet material. Two samples of polyester carpet fabric, each nine inches square, were boiled in water containing defoamer 2 + E of Example 1 in amount of 600 p.p.m. defoamer. The samples were tested in accordance with U.S. Specification DOC-FF-1-70* and both the rinsed and unrinsed samples passed the test.

*Only one sample was used in each test instead of eight as required by the specification.

EXAMPLE 5

Two samples were prepared each of which contained 87 percent by weight of silicone-polyether copolymer 2 of Example 1 and 13 percent by weight of a 50 percent by weight xylene solution of E of Example 1. The difference in samples was that in sample one, E had a solubility factor of 15.2 and in sample two, E had a solubility factor of 19.1. In both samples the two ingredients were compatible as shown by no separation after standing 12 hours.

Both samples were run in the hot pump test with the following results:

| Sample | Foam Height In Inches | Break Time In Seconds | Plated-Out |
|---|---|---|---|
| one | 1.5 | 10 | None |
| two | 2 | 10 | Slight |

Whereas two operated as a defoamer, one is superior.

EXAMPLE 6

Equivalent defoamers are obtained from the following combinations in which (1) and (2) are employed in amount 89 percent (1) and 11 percent (2) based on the combined weights of (1) and (2). In each case (2) is made by reacting resin B of the formula $(Me_3SiO_{.5})_{.75}(SiO_2)$, with the polyether C in the weight ratios shown using KOH as a catalyst.

| (1) | (2) | | |
|---|---|---|---|
| | Wt. % B | Wt. % C | C |
| $HO(C_2H_4O)_{50}(CH_2)_2SiO(SiMe_2O)_{20}\begin{Bmatrix} SiMeO \\ (CH_2)_2 \\ O \\ (C_2H_4O)_{50}H \end{Bmatrix}$ | $\begin{matrix} Me_2 \\ \| \\ Si(CH_2)_2O(C_2H_4O)_{50}H \end{matrix}$ 25 | 75 | $HO(C_2H_4O)_{15}H$ |

-continued

| (1) | Wt. % B | Wt. % C | (2) |
|---|---|---|---|
| $C_{10}H_{21}Si\{(OSiMe_2)_{300}(OSiMe(CH_2)_3O(C_2H_4O)_{12}(C_3H_6O)_{12}OC_4H_9)_3OSiMe_3\}_3$ | 45 | 55 | $HO(C_2H_4O)_{24}(C_3H_6O)_{10}H$ |

| (1) | Wt. % B | Wt. % C | (2) |
|---|---|---|---|
| $Si\{(OSiMe_2)_{100}(OSiMe(CH_2)_3O(C_2H_4O)_{12}(C_3H_6O)_{12}OCNC_6H_5)_{15}OSi(Me_2)(CH_2)_3O(C_2H_4O)_{12}-(C_3H_6O)_{12}CNC_6H_5\}_4$ | 17.5 | 82.5 | $HO(C_2H_4O)_{12}(C_3H_6O)_{12}H$ |

That which is claimed is:

1. A composition suitable for defoaming aqueous media consisting of
   1. from 80 to 96 percent by weight of a water soluble copolymer of the group consisting of
      $R_aSi\{(OSiMe_2)_n(OSiMeG)_mOSiMe_2G\}_{4-a}$,
      $R_aSi\{(OSiMe_2)_n(OSiMeG)_mOSiMe_3\}_{4-a}$,
      $GMe_2Si(OSiMe_2)_n(OSiMeG)_mOSiMe_2G$ and
      $Me_3Si(OSiMe_2)_n(OSiMeG)_mOSiMe_3$ in which
      Me is the methyl radical,
      n has an average value from 6 to 400,
      m has an average value from 3 to 30,
      a has a value from 0 to 1,
      R is a hydrocarbon radical free of aliphatic unsaturation of from 1 to 10 carbon atoms,
      G is a radical of the formula $-D(OR')_yOA$ in which
         D is an alkylene radical of 2 to 10 carbon atoms,
         R' is $-CH_2CH_2-$ or a combination of $-CH_2CH_2-$ and

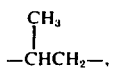

y has an average value of at least 5 and
         A is hydrogen or a capping group of from 1 to 10 carbon atoms and
   2. from 4 to 20 percent by weight of a copolymer compatible with (1) prepared by condensing
      B. a siloxane containing SiOH groups and being essentially of $Me_3SiO_{.5}$ and $SiO_2$ units in the mol ratio of from 0.4:1 to 1.2:1 and
      C. a polyether of the group consisting of polyethylene oxide, polypropylene oxide, and copolymers thereof in (2) the weight ratio of (B) to (C) being in the range 15 to 50 percent (B) to 50 to 85 percent (C).

2. The composition of claim 1 in which G is present in amount of from 50 to 85 percent by weight of (1).

3. The composition of claim 1 in which n is 100 to 200 and m is 4 to 20.

4. The composition of claim 1 in which (2) has a solubility factor of 14 to 17 inclusive.

5. The composition of claim 2 in which (2) has a solubility factor of 14 to 17 inclusive.

6. The composition of claim 3 in which (2) has a solubility factor of 14 to 17 inclusive.

* * * * *